United States Patent [19]
Le Cardonnel et al.

[11] 3,798,469
[45] Mar. 19, 1974

[54] CONTROL CIRCUITS

[75] Inventors: Gerard Marcel Le Cardonnel, Neuilly-sur-Seine; Jacques Victor Sandre, Fresnes; Serge Pontois, Paris, all of France

[73] Assignee: International Standard Electric Corporation, New York, N.Y.

[22] Filed: June 15, 1972

[21] Appl. No.: 263,043

[52] U.S. Cl. .......................... 307/247 R, 307/247 A
[51] Int. Cl. .......................... H03k 17/56
[58] Field of Search ............ 307/247 A, 247 R, 279, 307/262, 228

[56] References Cited

UNITED STATES PATENTS

| | | | |
|---|---|---|---|
| 3,147,388 | 9/1964 | Clark | 307/88.5 |
| 3,381,232 | 4/1968 | Hoernes et al. | 328/206 |
| 3,462,613 | 8/1969 | Wolf | 307/216 |
| 3,636,383 | 1/1972 | Clubbe | 307/291 |

*Primary Examiner*—Rudolph V. Rolinec
*Assistant Examiner*—Joseph E. Clawson, Jr.
*Attorney, Agent, or Firm*—John T. O'Halloran; Menotti J. Lombardi, Jr.; Alfred C. Hill

[57] ABSTRACT

A control circuit which activates a following bistable when it receives simultaneously a signal of one polarity on one of its two data inputs and a signal of the opposite polarity on its control input. This circuit is not sensitive to parasitics of the same polarity which may originate on the data or control inputs.

2 Claims, 2 Drawing Figures

CONTROL CIRCUITS

BACKGROUND OF THE INVENTION

The present invention relates to data transmission circuits providing immunity against noise signals, and applicable namely in centralized control telephone installations for distributing data to the various peripheral units.

In the centralized control telephone installations, the central unit acts upon the various peripheral units by sending appropriate orders. These orders are stored, in bistables for instance, inside the recipient units, in view of their use. In complex systems, where the units are in large number and the orders numerous, the number of transmission wires will be limited by having the bistables arranged in a matrix form, and, applying the method of coincidence — addressing for the control of a bistable.

To control a bistable of a matrix, it is in fact of current use to mark one row of the matrix by an address signal and to mark one column by a data signal indicating the position that has to be adopted by the bistable situated at the intersection of the marked row and column.

However, the control of a bistable necessitates some particular precautions when the bistables to be controlled are numerous and, therefore, when information traffic is considerable. Namely, the risks of induction of signals are high and it is recommendable to take steps, in particular, against noise signals originating along the address and data transmission wires simultaneously.

SUMMARY OF THE INVENTION

The present invention provides a simple and economical solution to the control of bistables or to the control of any similar device arranged in matrix form. It is characterized in that there is provided, in a control unit namely, a device which transmits an address signal having a first polarity, and a device which transmits a data signal having a second polarity; whereas with each recipient device (bistable) there is associated a combination circuit provided for receiving an address signal, and the data signals, and for supplying an outgoing signal to the recipient device only when it receives simultaneously an address signal having the first polarity and a data signal having the second polarity.

BRIEF DESCRIPTION OF THE DRAWINGS

Different features of the invention will become apparent from the description that follows, given by way of non-limiting example, in conjunction with the accompanying drawings comprising.

DESCRIPTION OF THE PREFERRED EMBODIMENT

Figure 1:
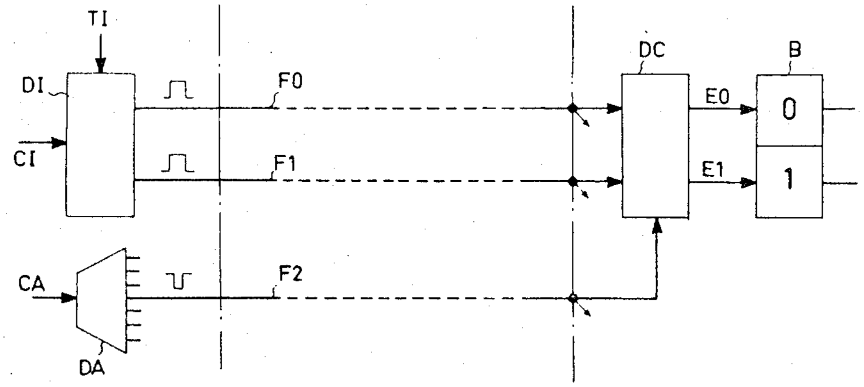
FIG. 1, the block diagram of an embodiment of transmission circuits arranged according to present invention.

In referring to FIG. 1, there will first be described the block diagram of an embodiment of the transmission circuits arranged according to the present invention.

In this figure, there can be seen a data signal transmission device DI, an address signal transmission device DA, three transmission wires (F0, F1 and F2), a combination circuit DC and a bistable B having two inlets E0 and E1.

The device DI has an inlet CI on which it receives data signals of binary value 0 or 1, and a control inlet TI. When it receives a control signal on inlet TI, it provides a positive data-signal along the wire F0 or along the wire FI according as to whether it receives a signal of value 0 or 1 on the inlet CI. It provides a low negative potential along the wires F0 and F1 in the absence of any signal.

The device DA provides, by the decoding of an address information received along link CA, a negative address-signal along one of the outgoing wires such as F2; and it provides a null potential in the contrary case. It thus designates the bistable to be controlled, for instance, the bistable B.

The combination circuit DC operates when it receives a positive-data signal along wire F0 or along wire F1, and a negative address signal along wire F2. It then provides an outgoing signal along wire E0 or along wire E1, according as to whether it receives a data signal along wire F0 or along wire F1; and this has for result to control the setting into position 0 or into position 1 of the bistable B. In the absence of a positive data signal along wires F0 and F1, any negative signal along wire F2 remains without effect upon the outputs of circuit DC. The bistable B cannot therefore change condition. Same is the case in the absence of a negative address-signal along wire F2.

It is seen therefore that the circuit DC can control the operation of bistable B only when it receives a positive signal along one of wires F0 or F1 and a negative signal along wire F2. It thus follows then that circuit DC is not sensitive to any parasitic of same polarity originating simultaneously along wire F2 and along the one, the other or both wires F0 and F1.

To control a bistable it is therefore necessary to provide, simultaneously, a data signal on inlet CI of the device D1, a control signal on inlet TI of the same device and an address information on the link CA of device DA. In response, the device DI transmits a positive signal, along one of wires F0 or F1, to all the circuits DC to which it has access (multipling arrows). Device DA decodes the address information and transmits a negative signal, say along wire F2 for instance, to circuit DC associated with bistable B designated by the address information. This bistable B then controls, as described above, the operation of bistable B.

Several bistables can be associated with the same address, the wire F2 (multipling arrow) leading onto several combination circuits. Among these devices, only DC receives the data signal originating from the transmitting device DI. Other transmitting devices identical to DI control the other bistables, and that completes a matricial arrangement.

Figure 2:
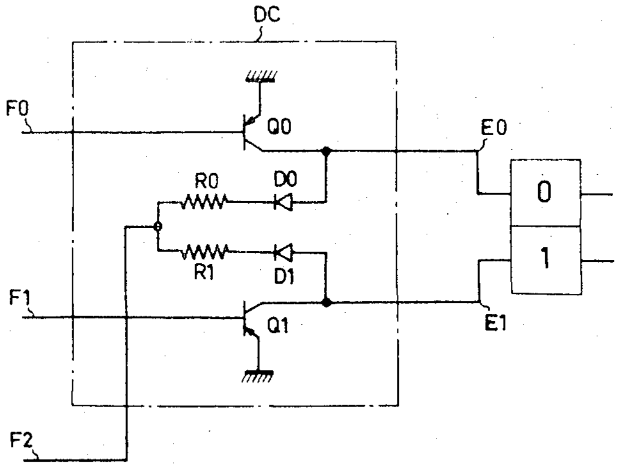
FIG. 2, an embodiment of the combination circuit in FIG. 1.

In referring to FIG. 2, there will now be described an embodiment of the combination circuit DC.

This circuit comprises mainly two transistors Q0 and Q1 and biasing circuits.

It is being assumed that the bistable will trigger to position 0 or 1 (if it is not already in that position) when it receives a negative signal along input wires E0 or E1 respectively.

In the absence of a positive signal, the wires F0 and F1 being at a low negative potential, transistors Q0 and Q1 are both conducting. A negative signal, received along wire F2, is transmitted by the decoupling resistors R0, R1, and by the decoupling diodes D0, D1, to the collectors of transistors Q0, Q1; and is shifted onto the earth potential through these transistors. Wires E0 and E1 remain at a null potential. Inlets of the bistable B do not receive any signal and the bistable does not change position.

A positive potential data signal, received along wire F0 for instance, blocks the transistor Q0. A negative signal received at the same instant along wire F2 is therefore transmitted, by the resistor R0 and diode D0, along wire E0. This signal has for effect to control the setting into position 0 of bistable B, if this latter is not already in that position. Likewise a data signal received along wire F1 enables the transmission, along wire E1, of a negative signal received along wire F2 for controlling the setting of the bistable into position 1.

It is seen therefore that circuit DC provides a signal, along one of wires E0 or E1, only when it receives simultaneously a positive signal along one of wires F0 or F1 and a negative signal along wire F2. This circuit is therefore indeed not sensitive to parasitics of same polarity which may originate simultaneously along wire F2, on the one hand, and along wires F0 or/and F1 on the other hand.

It is understood the foregoing description of a specific embodiment of this invention is made by way of example only and is not to be considered as a limitation on its scope.

We claim:

1. A control circuit to control a recipient device by the coincidence of two pulses comprising:

said recipient device having a first input and a second input;

a control unit having a first output to provide an address signal for said recipient device in the form of a first pulse having a first polarity;

a data unit having a second output to provide one binary condition of a data signal in the form of a second pulse having a second polarity opposite to said first polarity and a third output to provide the other binary condition of said data signal in the form of a third pulse having said second polarity; and a combination circuit including a first transistor having its emitter coupled to ground, its base coupled to said first input and its collector coupled to said second output, a second transistor having its emitter coupled to ground, its base coupled to said second input and its collector coupled to said third output, a first resistor having one of its terminals coupled to said first output, a first diode having one of its electrodes coupled to the other of the terminals of said first resistor and the other of its electrodes coupled to said collector of said first transistor, and a second resistor having one of its terminals coupled to said first output, a second diode having one of its electrodes coupled to the other of the terminals of said second resistor and the other of its electrodes coupled to said collector of said second transistor, said first transistor, said first resistor and said first diode providing an input signal for said first input only when said first and second pulses are time coincident, and said second transistor, said second resistor and said second diode providing an input signal for said second input only when said first and third pulses are time coincident.

2. In a data transmission system, a control circuit arrangement responsive to the time coincidence of an address signal for a bistable circuit in the form of a first pulse having a first polarity and one binary condition of a data signal in the form of a second pulse having a second polarity opposite said first polarity and to the time coincidence of said first pulse and the other binary condition of said data signal in the form of a third pulse having said second polarity, the arrangement comprising:

said bistable circuit having a first input and a second input;

a third input for said first pulse;

a fourth input for said second pulse;

a fifth input for said third pulse;

a first circuit including a first transistor having its emitter coupled to ground, its base coupled to said fourth input and its collector coupled to said first input, a first resistor having one of its terminals coupled to said third input, and a first diode having one of its electrodes coupled to the other of the terminals of said first resistor and the other of its electrodes coupled to the collector of said first transistor, said first circuit providing an input signal for said first input only when said first and second pulses are time coincident; and a second circuit including a second transistor having its emitter coupled to ground, its base coupled to said fifth input and its collector coupled to said second input, a second resistor having one of its terminals coupled to said third input, and a second diode having one of its electrodes coupled to the other of the terminals of said second resistor and the other of its electrodes coupled to the collector of said second transistor, said second circuit providing an input signal for said second input only when said first and third pulses are time coincident.

* * * * *